(12) United States Patent
Sethi et al.

(10) Patent No.: US 12,108,275 B2
(45) Date of Patent: Oct. 1, 2024

(54) METHOD AND BASE STATION FOR MANAGING SCHEDULING PERFORMANCE OF NGBR BEARERS

(71) Applicant: Samsung Electronics Co., Ltd., Suwon-si (KR)

(72) Inventors: Amarpreet Singh Sethi, Bangalore (IN); Jitender Singh Shekhawat, Bangalore (IN); Sahil Vaid, Bangalore (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 17/740,841

(22) Filed: May 10, 2022

(65) Prior Publication Data

US 2023/0276293 A1    Aug. 31, 2023

Related U.S. Application Data

(63) Continuation of application No. PCT/KR2022/005699, filed on Apr. 21, 2022.

(30) Foreign Application Priority Data

Feb. 25, 2022  (IN) .............................. 202241010306

(51) Int. Cl.
*H04W 28/02* (2009.01)
*H04L 1/00* (2006.01)
*H04W 28/20* (2009.01)

(52) U.S. Cl.
CPC ....... *H04W 28/0268* (2013.01); *H04L 1/0003* (2013.01); *H04W 28/0257* (2013.01); *H04W 28/20* (2013.01)

(58) Field of Classification Search
CPC ......... H04W 28/0252; H04W 28/0257; H04W 28/0268; H04W 28/16; H04W 28/20; H04W 28/24; H04W 28/26; H04L 1/0003
See application file for complete search history.

(56) References Cited

U.S. PATENT DOCUMENTS

| | | | |
|---|---|---|---|
| 8,913,494 B1 * | 12/2014 | Marupaduga ......... | H04W 28/24 370/329 |
| 2014/0031040 A1 * | 1/2014 | Lee ....................... | H04W 76/34 455/437 |

(Continued)

FOREIGN PATENT DOCUMENTS

| | | |
|---|---|---|
| CN | 105517165 B | 12/2018 |
| CN | 114071566 A | 2/2022 |

(Continued)

OTHER PUBLICATIONS

International Search Report and Written Opinion dated Nov. 14, 2022, issued in International Patent Application No. PCT/KR2022/005699.

(Continued)

*Primary Examiner* — Kevin D Mew
(74) *Attorney, Agent, or Firm* — Jefferson IP Law, LLP

(57) ABSTRACT

A method for managing scheduling performance of bearers by a base station in a wireless network is provided. The method includes determining a configured packet delay budget (PDB) of non-guaranteed bit rate (NGBR) bearers and a configured PDB of guaranteed bit rate (GBR) bearers; monitoring a PDB of the NGBR bearers and a PDB of the GBR bearers during data communication; determining an average of quality-of-service class identifier (QCI) divergence of the NGBR bearers and an average of QCI divergence of the GBR bearers, wherein the QCI divergence of a bearer is a percentage variation between a monitored PDB and a configured PDB of the bearer; and controlling resource (Continued)

allocation parameters for minimizing the average of QCI divergence of the NGBR bearers and the average of QCI divergence of the GBR bearers.

20 Claims, 8 Drawing Sheets

(56) References Cited

U.S. PATENT DOCUMENTS

| | | | |
|---|---|---|---|
| 2015/0049606 A1* | 2/2015 | So | H04L 47/11 |
| | | | 370/230 |
| 2015/0131545 A1* | 5/2015 | Ameigeiras Gutierrez | |
| | | | H04W 72/23 |
| | | | 370/329 |
| 2015/0296559 A1* | 10/2015 | Liu | H04L 65/60 |
| | | | 370/329 |
| 2016/0073299 A1* | 3/2016 | Liang | H04L 12/1407 |
| | | | 370/331 |
| 2016/0227564 A1* | 8/2016 | Stephenne | H04W 28/24 |
| 2017/0332282 A1* | 11/2017 | Dao | H04L 1/0002 |
| 2020/0112872 A1 | 4/2020 | Nimbavikar et al. | |
| 2020/0236581 A1* | 7/2020 | Zhang | H04W 28/082 |
| 2020/0280871 A1 | 9/2020 | Khirallah et al. | |
| 2020/0351718 A1* | 11/2020 | Dong | H04W 28/0252 |
| 2020/0383004 A1 | 12/2020 | Hande et al. | |
| 2020/0389907 A1 | 12/2020 | Jeon et al. | |
| 2020/0396637 A1* | 12/2020 | Wang | H04W 28/0268 |
| 2021/0153070 A1 | 5/2021 | Velev et al. | |
| 2021/0235399 A1 | 7/2021 | Wich et al. | |
| 2021/0410000 A1* | 12/2021 | Srivastava | H04W 28/0268 |
| 2022/0078857 A1 | 3/2022 | Kim | |

FOREIGN PATENT DOCUMENTS

| | | | |
|---|---|---|---|
| EP | 3 474 619 A1 | 4/2019 | |
| KR | 10-2331114 B1 | 11/2021 | |
| WO | WO-2013085325 A1 * | 6/2013 | H04L 47/32 |
| WO | WO-2014063749 A1 * | 5/2014 | H04W 28/0205 |
| WO | WO-2015039096 A1 * | 3/2015 | H04L 61/203 |
| WO | WO-2015042389 A1 * | 3/2015 | H04L 47/14 |
| WO | 2020-141859 A1 | 7/2020 | |
| WO | 2022/028873 A1 | 2/2022 | |
| WO | 2022/036490 A1 | 2/2022 | |

OTHER PUBLICATIONS

Indian Examination Report dated Apr. 1, 2024, issued in Indian Application No. 202241010306.

* cited by examiner

METHOD AND BASE STATION FOR MANAGING SCHEDULING PERFORMANCE OF NGBR BEARERS

CROSS-REFERENCE TO RELATED APPLICATION(S)

This application is a continuation application, claiming priority under § 365(c), of an International application No. PCT/KR2022/005699, filed on Apr. 21, 2022, which is based on and claims the benefit of an Indian patent application number 202241010306, filed on Feb. 25, 2022, in the Indian Intellectual Property Office, the disclosure of which is incorporated by reference herein in its entirety.

FIELD OF INVENTION

The disclosure relates to wireless communication. More particularly, the disclosure relates to a method and a base station for managing scheduling performance of Non-Guaranteed Bit Rate (NGBR) bearers and Guaranteed Bit Rate (GBR) bearers in a wireless network.

BACKGROUND

A $5^{th}$ Generation (5G) cellular system allows a User Equipment (UE) to have up to 30 configured bearers as compared to a 5G cellular system, where the bearers may be GBR bearers or NGBR bearers. The GBR bearers and the NGBR bearers have their own Quality-of-Service (QoS) requirements characterized by factors such as Priority, Packet Delay Budget (PDB), Packet Error Loss (PEL) rate, etc. The GBR bearers are configured with a guaranteed bit rate that must be absolutely met and a Maximum Bit Rate (MBR) which is an absolute maximum up to which a bearer should be served. In addition, the UE is configured with an Aggregate Maximum Bit Rate (AMBR) which is an allowed aggregated bit rate across all NGBR bearers. In 5G cellular system, it is expected that there will be a fair proportion of traffic for both GBR services and the GBR services. Examples of the GBR services include a conversational voice, a conversational video call, a non-conversational video call (e.g. User Datagram Protocol) (UDP) based video), a real time gaming, a live uplink streaming, a mission critical application. Examples of the GBR services include web browsing, file downloads, and a Transmission Control Protocol (TCP) based video will continue to have large share of traffic volume.

Each QoS Class Identifier (QCI) across the GBR bearers and the NGBR bearers should ideally be served close to its configured QCI characteristics PDB, packet loss, throughput (i.e. GBR/AMBR). Existing 5G radio resource schedulers are designed for requirements to guarantee QCI characteristics (i.e. PDB, Throughput) for the GBR bearers while attempting to meet QoS requirements of the NGBR bearers in a best effort manner. The existing 5G radio resource schedulers need to find a most optimal balance between multiple competing objectives such as the throughput maximization, fairness maximization, delay minimization. The existing 5G radio resource schedulers are operating in a very complex operating environment with multiple dynamic factors such as changing traffic patterns-based demography, varying number of subscribers, stochastic radio conditions, interference, and mobility. The existing 5G radio resource schedulers that use heuristic scheme for scheduling radio resources to the bearers, which have limitations such as difficultly to control all factors simultaneously, large amount of control parameters to be tuned manually, not quickly responsive to dynamic channel and traffic needs, not suitable to provide increased throughput and latency demands, uses static thresholds for decision making which don't adapt to dynamic traffic and channel conditions.

Moreover, the existing 5G radio resource schedulers tend to over prioritize the GBR bearers at an expense of reducing priority of the NGBR bearers, which leads to a large skew in QoS compliance between the GBR bearers and the NGBR bearers. For example, consider that the GBR bearer is served with an average PDB of 50 milliseconds (ms) even though the configured PDB of the GBR bearer is 300 ms, which is equivalent to over exceeding a QCI target by 500%. At the same time the NGBR bearer may be experiencing the average PDB of 900 ms even though the configured PDB of the NGBR bearer is 300 ms, which is equivalent to missing the QCI target by 200%.

Thus, the existing 5G radio resource schedulers tend to use greedy mechanism of resource allocation across the bearers leading to poor handing of the priority among the NGBR bearers. Moreover, the existing 5G radio resource schedulers are highly biased treatment for the GBR QCI classes over the NGBR QCI classes, which lead to variance in QoS compliance across QoS classes and a poor QoS experience for the NGBR bearers. Hence, it is desired to provide a useful solution for enhancing relative scheduling performance of the NGBR bearers compared to the GBR bearers.

The above information is presented as background information only to assist with an understanding of the disclosure. No determination has been made, and no assertion is made, as to whether any of the above might be applicable as prior art with regard to the disclosure.

OBJECT OF INVENTION

Aspects of the disclosure are to address at least the above-mentioned problems and/or disadvantages and to provide at least the advantages described below. Accordingly, aspect of the disclosure is to provide a method and a base station for enhancing relative scheduling performance of NGBR bearers compared to GBR bearers in a wireless network. Artificial Intelligence (AI) (e.g. Reinforcement Learning (RL)) based scheduling scheme of the method ensures an observed PDB converges towards a configured PDB for all QCI classes (i.e. GBR bearers and NGBR bearers), and higher priority bearers still achieve better performance.

Another aspect of the disclosure is to adapt an AI based scheduling scheme for achieving a desired balance in scheduling/allocating radio resources to the GBR bearers and the NGBR bearers at varying radio conditions, varying traffic conditions, and varying number of UEs.

Another aspect of the disclosure is to improve overall throughput of a proposed AI based scheduler of the base station better than an existing heuristic scheduler in terms of a time taken to achieve a peak throughput.

Another aspect of the disclosure is to provide a significant improvement in an observed average PDB for the NGBR bearers.

Additional aspects will be set forth in part in the description which follows and, in part, will be apparent from the description, or may be learned by practice of the presented embodiments.

SUMMARY

In accordance with an aspect of the disclosure, a method for managing scheduling performance of by a base station in a wireless network is provided. The method includes determining a configured packet delay budget (PDB) of non-guaranteed bit rate (NGBR) bearers and a configured PDB of guaranteed bit rate (GBR) bearers, monitoring a PDB of the NGBR bearers and a PDB of the GBR bearers during data communication, determining an average of quality-of-service class identifier (QCI) divergence of the NGBR bearers and an average of QCI divergence of the GBR bearers, wherein the QCI divergence of a bearer is a percentage variation between a monitored PDB and a configured PDB of the bearer, and controlling resource allocation parameters for minimizing the average of QCI divergence of the NGBR bearers and the average of QCI divergence of the GBR bearers.

In accordance with another aspect of the disclosure, a method for managing scheduling performance of bearers by the base station in the wireless network is provided. The method includes determining a configured packet delay budget (PDB) of bearers of each quality-of-service class identifier (QCI) class; monitoring the PDB of the bearers of each QCI class during data communication; determining an average of QCI divergence of the bearers of each QCI class, wherein the QCI divergence of a bearer is a percentage variation between a monitored PDB and a configured PDB of the bearer; and controlling resource allocation parameters, priority metric parameters of the bearers of each QCI class for minimizing the average QCI divergence of the bearers of each QCI class.

In accordance with another aspect of the disclosure, a base station for managing scheduling performance of bearers in the wireless network is provided. The base station includes a memory, and at least one processor coupled to the memory. The at least one processor is configured to determine a configured packet delay budget (PDB) of the non-guaranteed bit rate (NGBR) bearers and a configured PDB of guaranteed bit rate (GBR) bearers, monitor a PDB of the NGBR bearers and a PDB of the GBR bearers during data communication, determine an average of quality-of-service class identifier (QCI) divergence of the NGBR bearers and an average of QCI divergence of the GBR bearers, wherein the QCI divergence of a bearer is a percentage variation between a monitored PDB and a configured PDB of the bearer, and control resource allocation parameters for minimizing the average of QCI divergence of the NGBR bearers and the average of QCI divergence of the GBR bearers.

In accordance with another aspect of the disclosure, a base station for managing scheduling performance of bearers in the wireless network is provided. The base station includes a memory; and at least one processor coupled to the memory. The at least one processor is configured to determine a configured packet delay budget (PDB) of bearers of each quality-of-service class identifier (QCI) class, monitor the PDB of the bearers of each QCI class during data communication, determine an average of QCI divergence of the bearers of each QCI class, wherein the QCI divergence of a bearer is a percentage variation between a monitored PDB and a configured PDB of the bearer, and control resource allocation parameters, and priority metric parameters of the bearers of each QCI class for minimizing the average QCI divergence of the bearers of each QCI class.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF INVENTION

Figure 1:
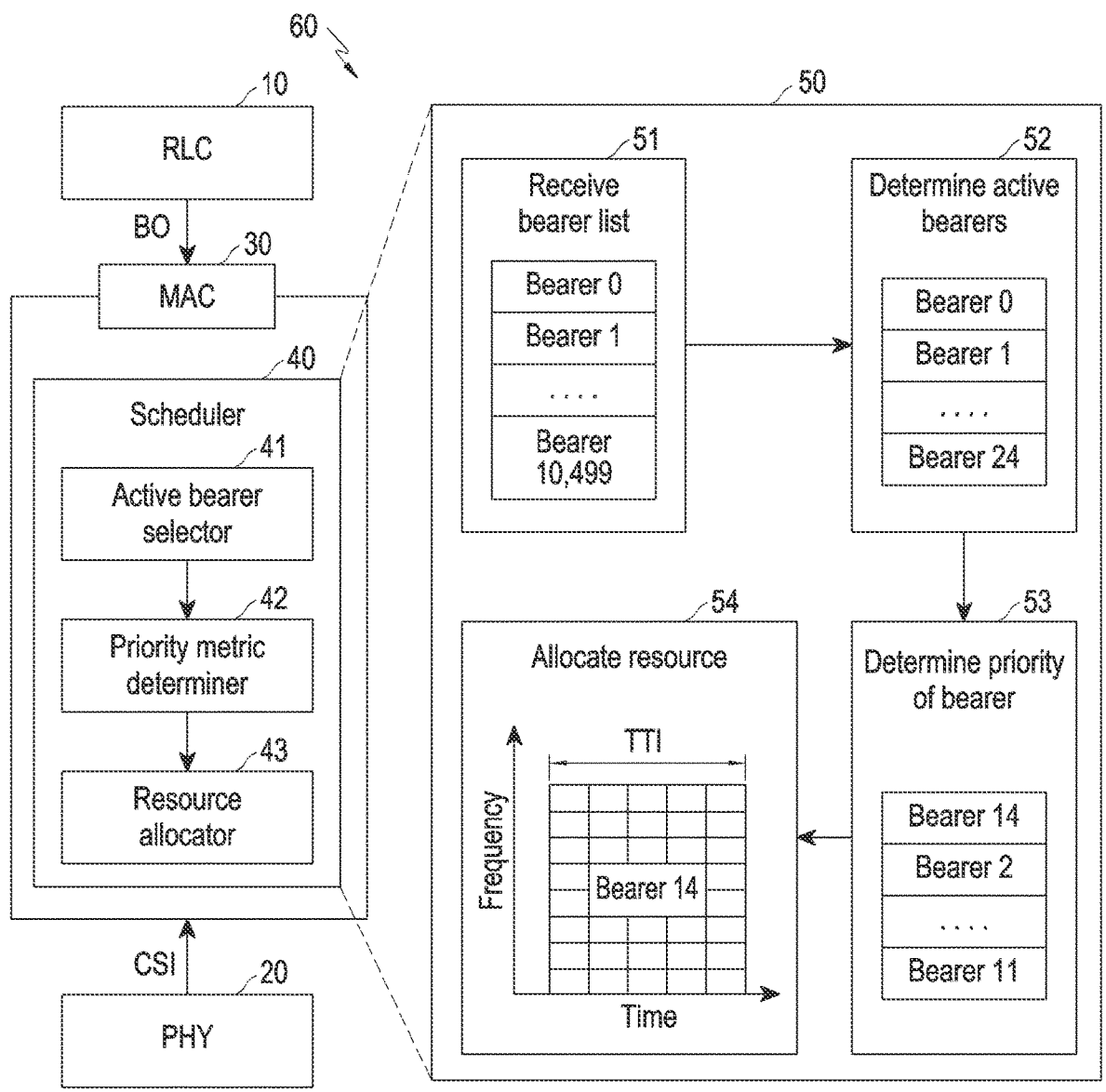
FIG. 1 is a block diagram of an existing scheduler of a base station for scheduling bearers in a wireless network, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

FIG. 1 is a block diagram 60 of an existing scheduler (40) (e.g. 5$^{th}$ Generation New Radio scheduler) of a base station for scheduling bearers in a wireless network, according to an embodiment of the disclosure.

The existing scheduler (40) operates under a Medium Access Control (MAC) layer (30) of the base station, where the MAC layer (30) receives BO and Channel State Information (CSI) from a Radio Link Control (RLC) layer (10) and a physical (PHY) layer (20) respectively. At 50, the scheduler (40) allocates radio resources for bearers based on the BO and the CSI received at the MAC layer (30). The scheduler (40) is designed with multiple competing objectives such as throughput maximization, fairness maximization, delay minimization, etc. The scheduler (40) includes an active bearer selector (41), a priority metric determiner (42), and a resource allocator (43). 51-54 are the sub-steps under the step 50.

At 51, the active bearer selector (41) receives a list of bearers (e.g. bearer 0 to bearer 10,499) in the base station. At 52, the active bearer selector (41) determines active bearers connected to UEs (e.g. bearer 0 to bearer 24) from the list of bearers. At 53, the priority metric determiner (42) determines a priority metric of each active bearer in each Transmission Time Interval (TTI) or each time slot, where the priority metric is a function of QCI, PDB, MCS, Average ThroughPut (ATP), and the BO. Each UE is associated with 'K' bearers of the base station. $UE_n^k$ is representation of kth bearer of nth UE. In each time slot, the priority metric determiner (42) tries to find out 'M' highest priority schedulable UEs out of 'N' connected UEs and the prioritized bearer list is re-organized to determine a prioritized UE list. The scheduling process at each TTI may be represented as $[UE_1, UE_2, UE_3 \ldots, UE_M] \in [UE_1, UE_2, UE_3 \ldots, UE_N]$, where M<<N. At 54, the resource allocator (43) allocates the radio resources to the bearers in an order of the priority of the bearers. Allocation of the radio resource allocation also takes into account by the resource allocator (43) a best suited resources for the UE, better QCI compliance for higher QCI priority bearers including GBR bearers over NGBR bearers as well as resource usage maximization.

Accordingly, the embodiments herein provide a method for enhancing relative scheduling performance of NGBR bearers by the base station in a wireless network. The method includes determining, by a base station, a configured PDB of the NGBR bearers and GBR bearers. The method includes monitoring a PDB of the NGBR bearers and GBR bearers during data communication. The method includes determining an average of QCI divergence of the NGBR bearers and an average of QCI divergence of the GBR bearers, where the QCI divergence of a bearer is a percentage variation between a monitored PDB and a configured PDB of the bearer. The method includes minimizing the average of QCI divergence of the NGBR bearers and the average of QCI divergence of the GBR bearers by controlling resource allocation parameters using an AI engine.

Accordingly, other embodiments herein provide a method for enhancing relative scheduling performance of the NGBR bearers by the base station in the wireless network. The method includes determining a configured PDB of bearers of each QCI class, where the QCI class is a 5QI value. The method includes monitoring the PDB of the bearers of each QCI class during data communication. The method includes determining an average of QCI divergence of the bearers of each QCI class, where the QCI divergence of a bearer is a percentage variation between a monitored PDB and a configured PDB of the bearer. The method includes minimizing the average QCI divergence of the bearers of each QCI class by controlling resource allocation parameters, and priority metric parameters of the bearers of each QCI class using the AI engine.

Accordingly, yet other embodiments herein provide the base station for enhancing relative scheduling performance of the NGBR bearers in the wireless network. The base station includes an AI based scheduler, a memory, a processor, where the AI based scheduler is coupled to the memory and the processor. The AI based scheduler is configured for determining the configured PDB of the NGBR bearers and GBR bearers. The AI based scheduler is configured for monitoring the PDB of the NGBR bearers and GBR bearers during data communication. The AI based scheduler is configured for determining the average of QCI divergence of the NGBR bearers and the average of QCI divergence of the GBR bearers, where the QCI divergence of the bearer is the percentage variation between the monitored PDB and the configured PDB of the bearer. The AI based scheduler is configured for minimizing the average of QCI divergence of the NGBR bearers and the average of QCI divergence of the GBR bearers by controlling resource allocation parameters using the AI engine.

Accordingly, the embodiments herein provide the base station for enhancing relative scheduling performance of the NGBR bearers in the wireless network. The base station includes the AI based scheduler, the memory, the processor, where the AI based scheduler is coupled to the memory and the processor. The AI based scheduler is configured for determining the configured PDB of bearers of each QCI class, where the QCI class is the 5QI value. The AI based scheduler is configured for monitoring the PDB of the bearers of each QCI class during data communication. The AI based scheduler is configured for determining the average of QCI divergence of the bearers of each QCI class, where the QCI divergence of the bearer is the percentage variation between the monitored PDB and the configured PDB of the bearer. The AI based scheduler is configured for minimizing the average QCI divergence of the bearers of each QCI class by controlling resource allocation parameters, and priority metric parameters of the bearers of each QCI class using the AI engine.

Existing heuristic methods lead to a huge divergence between an observed PDB and a configured PDB such that higher priority bearers have much lower PDB variance as compared to lower priority bearers. Unlike the existing methods, the AI based scheduling scheme of the proposed method ensures an observed PDB converges towards a configured PDB for all QCI classes (i.e. GBR bearers and NGBR bearers), and higher priority bearers still achieve better performance. Thus, the proposed method has significant improvement in the relative performance of bearers of all QCI classes.

The existing heuristic methods lead to the huge divergence between the observed PDB and the configured PDB such that the GBR bearers meet its configured QCI with a huge margin while the NGBR bearers miss its configured PDB by a huge margin. Unlike the existing methods, the AI based scheduling scheme of the proposed method ensures an improvement in an observed average PDB for the NGBR bearers, an observed average PDB for the GBR bearers is still very good.

Unlike the existing methods and system, the proposed method allows the AI based scheduling scheme to adapt at varying radio conditions, varying traffic conditions, and varying number of UEs for achieving a desired balance in scheduling/allocating radio resource to the bearers.

Unlike the existing methods and system, the proposed method improves an overall throughput of a proposed AI based scheduler better than an existing heuristic scheduler in terms of a time taken to achieve a peak throughput.

Referring now to the drawings, and more particularly to FIGS. 2 through 7, there are shown preferred embodiments.

Figure 2:
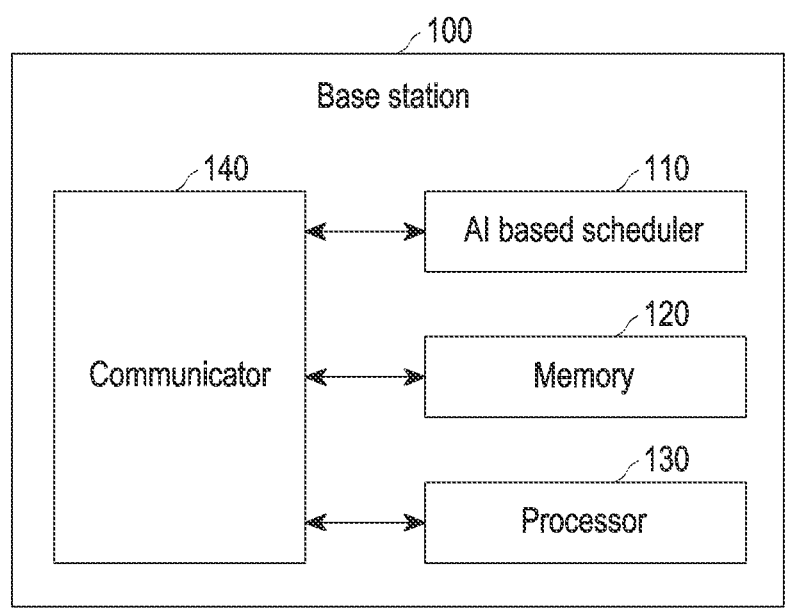
FIG. 2 is a block diagram of a base station for enhancing relative scheduling performance of NGBR bearers in the wireless network, according to an embodiment of the disclosure.

FIG. 2 is a block diagram of a base station for enhancing relative scheduling performance of NGBR bearers in a wireless network, according to an embodiment of the disclosure.

An example of the base station (100) is a gNodeB. In an embodiment, the base station (100) includes an AI based scheduler (110), a memory (120), a processor (130), and a communicator (140). The AI based scheduler (110) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like. In an embodiment, the AI based scheduler (110) includes an active bearer selector (111), a priority metric determiner (112), a resource allocator (113), and an AI engine (114) (refer FIG. 4 or FIG. 5). The operations executed by the AI based scheduler (110) and the processor (130) may be considered as operations executed at least one processor.

The AI based scheduler (110) determines the configured PDB of the NGBR bearers and GBR bearers. The AI based scheduler (110) monitors a PDB of the NGBR bearers and the GBR bearers in real time during data communication of the base station (100) with UEs. The AI based scheduler (110) determines an average of QCI divergence of the NGBR bearers and an average of QCI divergence of the GBR bearers. The QCI divergence of a bearer is a percentage variation between a monitored PDB and a configured PDB of the bearer.

Consider an example scenario in which the GBR bearer served with the PDB of 5 ms in real time during the data communication even though its configured PDB is 100 ms, then the average QCI divergence for the GBR bearer is −95%. At the same time the NGBR bearer served with the PDB of 900 ms in real time during the data communication even though the configured PDB is 300 ms, then the average QCI divergence for the NGBR bearer is 200%. Consider two GBR bearers with respective QCI divergence of −90% and −80%, then the average QCI divergence is −85%.

The AI based scheduler (110) minimizes the average of QCI divergence of the NGBR bearers and the average of QCI divergence of the GBR bearers by controlling resource allocation parameters using the AI engine (114). The resource allocation parameters include a number of the GBR bearers to be served before the NGBR bearers, a maximum amount of allocable pending data of the GBR bearers, and a maximum amount of allocable pending data of the NGBR bearers.

The AI based scheduler (110) maintains the PDB of each GBR bearer to be lesser than the configured PDB of the GBR bearer for minimizing the average of QCI divergence of the GBR bearers. In an embodiment, the AI based scheduler (110) determines the resource allocation parameters using the AI engine (114). Further, the AI based scheduler (110) allocates RBs (i.e. radio resource) to the GBR bearers and the NGBR bearers based on the resource allocation parameters for the data communication.

In an embodiment, the AI based scheduler (110) receives a list of prioritized GBR bearers and a list of prioritized NGBR bearers. Further, the AI based scheduler (110) determining that the RBs are available to allocate. Further, the AI based scheduler (110) determining whether served GBR bearers are less than the number of the GBR bearers to be served before the NGBR bearers. The AI based scheduler (110) allocates the RBs to next prioritized GBR bearers based on the maximum amount of allocable pending data of the GBR bearers, in response to determining that the served GBR bearers are less than the number of the GBR bearers to be served before the NGBR bearers. The AI based scheduler (110) allocates the RBs to next prioritized NGBR bearers based on the maximum amount of allocable pending data of the NGBR bearers, in response to determining that the served GBR bearers are not less than the number of the GBR bearers to be served before the NGBR bearers.

In another embodiment, the AI based scheduler (110) determines a state of the AI engine (114) including a MCS-BO distribution for the GBR bearers, a MCS-BO distribution for the NGBR bearers, and a throughput of the base station (100). Further, the AI based scheduler (110) determines a state of the AI engine (114) including the resource allocation parameters using the AI engine (114) based on the state for obtaining a reward of the AI engine (114) including minimization of the average QCI divergence and maximization of the throughput.

In yet another embodiment, the AI based scheduler (110) determines a configured PDB of bearers of each QCI class. The QCI class is a 5QI value. Further, the AI based scheduler (110) monitors the PDB of the bearers of each QCI class in real time during the data communication. Further, the AI based scheduler (110) determines an average of QCI divergence of the bearers of each QCI class.

Consider an example scenario in which bearers 1-4 are the NGBR bearers, where the bearers 1-2 are listed in QCI class 6, and bearers 3-4 are listed in QCI class 8. A QCI divergence of the bearers of each QCI class and the average of QCI divergence of each QCI class is given in Table 1.

TABLE 1

| Bearer | QCI | QCI divergence | Average QCI divergence per QCI class |
|---|---|---|---|
| 1 | 6 | 200% | 250% |
| 2 | 6 | 300% | |
| 3 | 8 | 100% | 150% |
| 4 | 8 | 200% | |

The AI based scheduler (110) minimizes the average QCI divergence of the bearers of each QCI class by controlling the resource allocation parameters, and priority metric parameters of the bearers of each QCI class using the AI engine (114). The priority metric parameters include a QCI priority weightage of the NGBR bearers and a QCI priority weightage of the GBR bearers.

In an embodiment, the AI based scheduler (110) determines the resource allocation parameters and the priority metric parameter. Further, the AI based scheduler (110) allocates the RBs to the GBR bearers and the NGBR bearers based on the resource allocation parameters and the priority metric parameters for the data communication.

In another embodiment, the AI based scheduler (110) receives the list of prioritized GBR bearers and the list of prioritized NGBR bearers adjusted based on the priority metric parameters. Further, the AI based scheduler (110) determines that the RBs are available to allocate. Further, the AI based scheduler (110) determines whether the served GBR bearers are less than the number of the GBR bearers to be served before the NGBR bearers. The AI based scheduler (110) allocates the RBs to next prioritized GBR bearers based on the maximum amount of allocable pending data of the GBR bearers, in response to determining that the served GBR bearers are less than the number of the GBR bearers to be served before the NGBR bearers. The AI based scheduler (110) allocates the RBs to next prioritized NGBR bearers based on the maximum amount of allocable pending data of the NGBR bearers, in response to determining that the served GBR bearers are not less than the number of the GBR bearers to be served before the NGBR bearers.

In yet another embodiment, the AI based scheduler (110) determines the state of the AI engine (114) include the MCS-BO distribution for the GBR bearers, the MCS-BO distribution for the NGBR bearers, and the throughput of the base station (100). Further, the AI based scheduler (110) determines the resource allocation parameters and the priority metric parameters using the AI engine (114) based on the state for obtaining a reward of the AI engine (114) includes the minimization of the average QCI divergence per QCI class and the maximization of the throughput.

In an embodiment, the maximum amount of allocable pending data of the GBR bearers is determined based the configured GBR of the GBR bearers, and the maximum amount of allocable pending data of the NGBR bearers is determined based on a configured AMBR and a configured QCI priority of the NGBR bearers.

In another embodiment, the AI engine (114) uses a reinforcement learning to homogenize scheduling performance of the bearers and thereby Quality-of-Experience (QoE) across all configured bearers belonging to different QCI classes and to improve the relative scheduling performance of the NGBR bearers.

QCI divergence is the reward provided by a RL based AI engine (114) that uses the Markov Decision Process (MDP) to the AI based scheduler (110) for controlling/tuning the action parameters includes the resource allocation parameters and the priority metric parameters. The resource allocation parameters include the number of GBR bearers to be served before NGBR bearers, the maximum amount of allocable pending data of the GBR bearers, the maximum amount of allocable pending data of the NGBR bearers. The priority metric parameters of the bearer comprising the QCI priority weightage of the NGBR bearers and the QCI priority weightage of the GBR bearers using the AI engine (114).

The memory (120) stores the state, the reward, and the action of the AI engine (114). The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) may be configured to store larger amounts of information than its storage space. In certain examples, a non-transitory storage medium may store data that can, over time, change (e.g., in Random Access Memory (RAM) or cache). The memory (120) may be an internal storage unit or it may be an external storage unit of the base station (100), a cloud storage, or any other type of external storage.

The processor (130) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the base station (100). Further, the communicator (140) is configured to facilitate the communication between the base station (100) and other devices via one or more networks (e.g. Radio technology). The communicator (140) includes an electronic circuit specific to a standard that enables wired or wireless communication.

At least one of plurality of modules of the AI based scheduler (110) may be implemented through the AI engine (114). A function associated with AI engine (114) may be performed through the non-volatile/volatile memory (120), and the processor (130). The one or a plurality of processors (130) control the processing of the input data in accordance with a predefined operating rule or the AI engine (114) stored in the non-volatile/volatile memory (120). The predefined operating rule or the AI engine (114) is provided through training or learning. Here, being provided through learning means that, by applying a learning method to a plurality of learning data, the predefined operating rule or the AI engine (114) of a desired characteristic is made. The learning may be performed in the base station (100) itself in which the AI engine (114) according to an embodiment is performed, and/o may be implemented through a separate server/system.

The AI engine (114) may consist of a plurality of neural network layers. Each layer has a plurality of weight values, and performs a layer operation through calculation of a previous layer and an operation of a plurality of weights. Examples of neural networks include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Networks (GAN), and deep Q-networks. The learning method is a method for training a predetermined target device (for example, a robot) using a plurality of learning data to cause, allow, or control the target device to make a determination or prediction. Examples of the learning method include, but are not limited to, supervised learning, unsupervised learning, semi-supervised learning, or reinforcement learning.

Although the FIG. 2 shows the hardware components of the base station (100) but it is to be understood that other embodiments are not limited thereon. In other embodiments, the base station (100) may include less or a greater number of components. Further, the labels or names of the components are used only for illustrative purpose and does not limit the scope of the disclosure. One or more components may be combined together to perform same or substantially similar function for enhancing relative scheduling performance of the NGBR bearers.

Figure 3A:
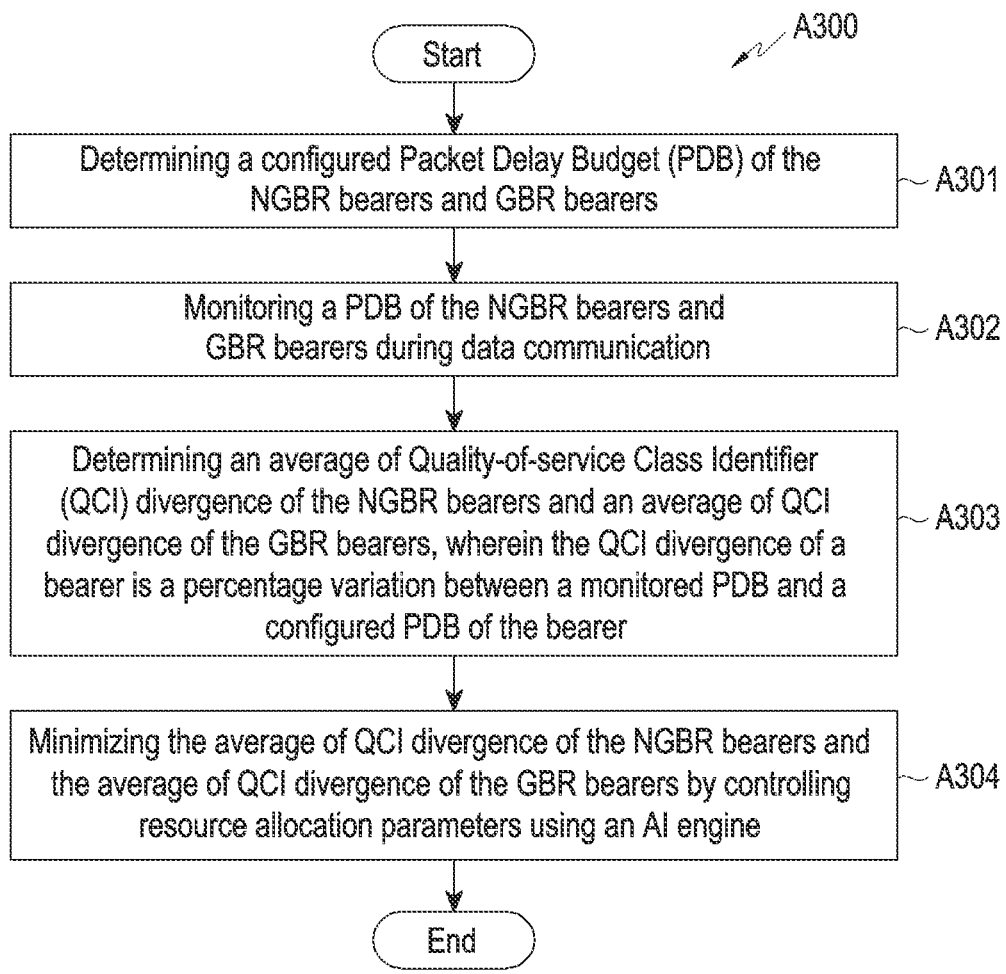
FIG. 3A illustrates a flow diagram of a method for enhancing relative scheduling performance of the NGBR bearers in the wireless network, according to an embodiment of the disclosure.

FIG. 3A illustrates a flow diagram (A300) of a method for enhancing relative scheduling performance of the NGBR bearers in the wireless network, according to an embodiment of the disclosure.

Referring to 3A, the method allows the AI based scheduler (110) to perform operations A301-A304 of the flow diagram (A300). At operation A301, the method includes determining the configured PDB of the NGBR bearers and the GBR bearers. At operation A302, the method includes monitoring the PDB of the NGBR bearers and the GBR bearers during the data communication. At operation A303, the method includes determining the average of QCI divergence of the NGBR bearers and the average of QCI divergence of the GBR bearers, where the QCI divergence of the bearer is the percentage variation between the monitored PDB and the configured PDB of the bearer. At operation A304, the method includes minimizing the average of QCI divergence of the NGBR bearers and the average of QCI divergence of the GBR bearers by controlling resource allocation parameters using the AI engine (114).

Figure 3B:
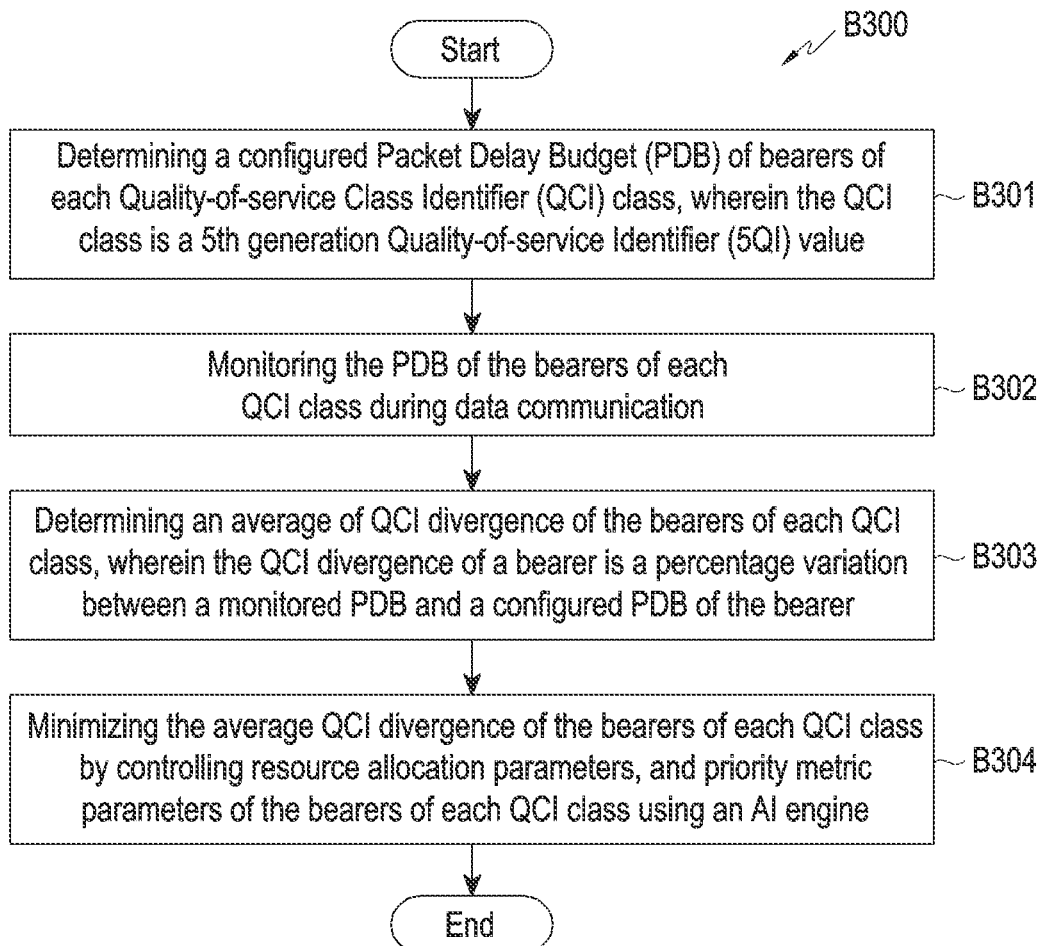
FIG. 3B illustrates a flow diagram of the method for enhancing relative scheduling performance of the NGBR bearers in the wireless network, according to an embodiment of the disclosure.

FIG. 3B illustrates a flow diagram (B300) of the method for enhancing relative scheduling performance of the NGBR bearers in the wireless network, according to an embodiment of the disclosure.

Referring to FIG. 3B, the method allows the AI based scheduler (110) to perform operations B301-B304 of the flow diagram (B300). At operation B301, the method includes determining the configured PDB of the bearers of each QCI class, where the QCI class is the 5QI value. At operation B302, the method includes monitoring the PDB of the bearers of each QCI class during the data communication. At operation B303, the method includes determining the average of QCI divergence of the bearers of each QCI class, where the QCI divergence of the bearer is the percentage variation between the monitored PDB and the configured PDB of the bearer. At operation B304, the method includes minimizing the average QCI divergence of the bearers of each QCI class by controlling the resource allocation parameters, and the priority metric parameters of the bearers of each QCI class using the AI engine (114).

Figure 4:
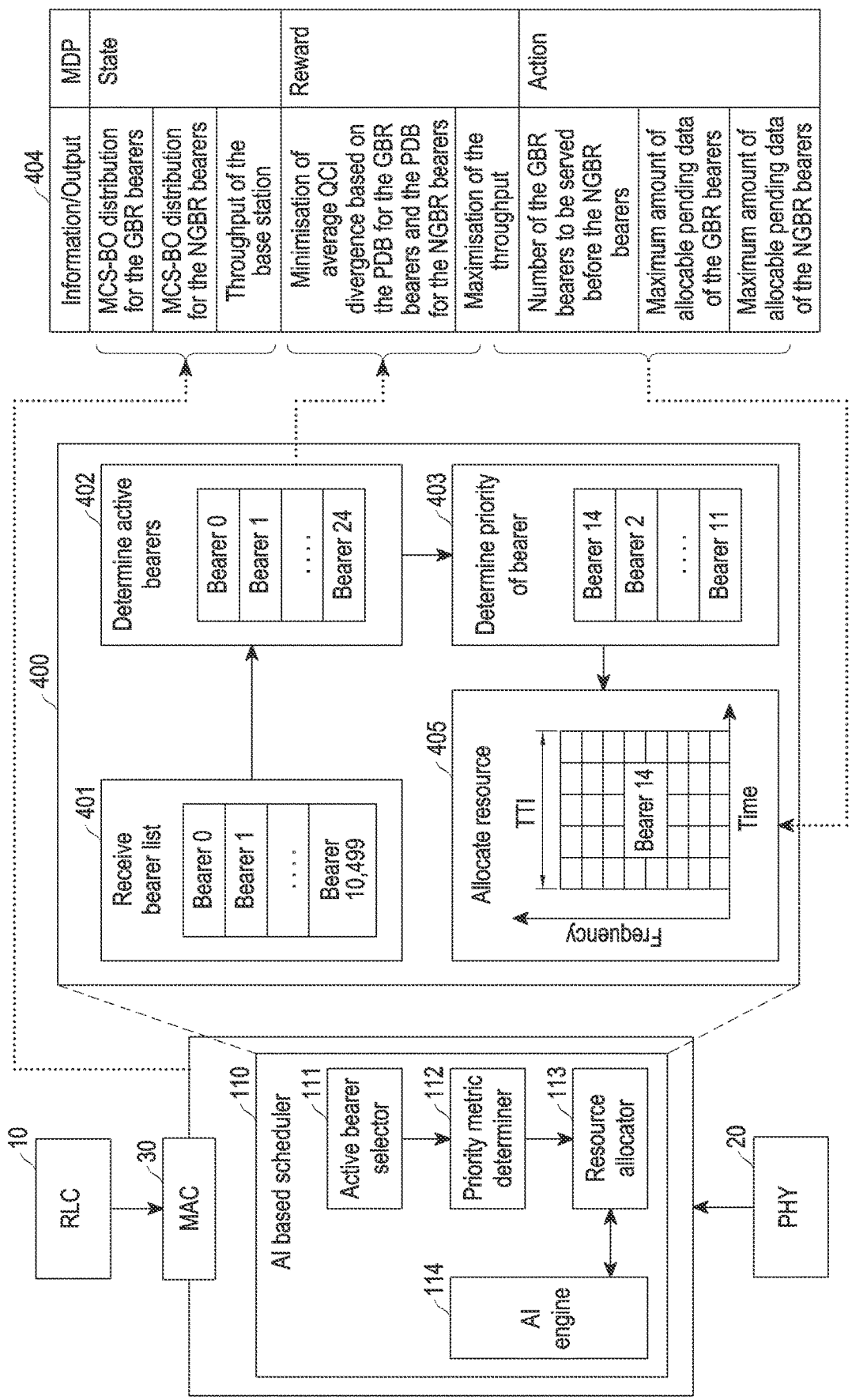
FIG. 4 is a block diagram of an AI based scheduler of the base station for minimizing an average of QCI divergence of the NGBR bearers and an average of QCI divergence of GBR bearers, according to an embodiment of the disclosure.

FIG. 4 is a block diagram of the AI based scheduler (110) of the base station (100) for minimizing the average of QCI divergence of the NGBR bearers and the average of QCI divergence of GBR bearers, according to an embodiment of the disclosure.

The AI based scheduler (110) operates under a MAC layer (30) of the base station (100), where the MAC layer (30) receives the BO and CSI from a RLC layer (10) and a PHY layer (20) respectively. At 400, the AI based scheduler (110) allocates the radio resources for bearers based on the BO and the CSI received at the MAC layer (30) by minimizing the average of QCI divergence of the NGBR bearers and the average of QCI divergence of GBR bearers. 401-405 are the sub-operations under the operation 400.

At operation 401, the active bearer selector (111) receives the list of bearers (e.g. bearer 0 to bearer 10,499) in the base station (100), where the bearers are the GBR bearers and the NGBR bearers. At operation 402, the active bearer selector (111) determines active bearers connected to the UEs (e.g. bearer 0 to bearer 24) from the list of bearers. The active bearer selector (111) determines the configured PDB of the active bearers includes the NGBR bearers and GBR bearers. Further, the active bearer selector (111) monitors the PDB of the NGBR bearers and the GBR bearers during data communication. Further, the active bearer selector (111) determines the average of QCI divergence of the NGBR bearers and the average of QCI divergence of the GBR bearers. At operation 403, the priority metric determiner (112) determines the priority metric of each active bearer in each TTI or each time slot, where the priority metric is a function of the QCI, the PDB, the MCS, ATP, and the BO.

Further, the resource allocator (113) minimizes the average of QCI divergence of the NGBR bearers and the average of QCI divergence of the GBR bearers by controlling the resource allocation parameters using the AI engine (114). For minimizing the average of QCI divergence, at 404 the resource allocator (113) determines the state of the AI engine (114) includes the MCS-BO distribution for the GBR bearers, the MCS-BO distribution for the NGBR bearers, and the throughput of the base station (100). Further, the resource allocator (113) determines the resource allocation parameters using the AI engine (114) based on the state for obtaining the reward of the AI engine (114) including the minimization of the average QCI divergence and maximization of the throughput. At 405, the resource allocator (43) allocates the radio resources to the bearers based on the resource allocation parameters and an order of the priority of the bearers. The proposed method ensures that the GBR bearers still meet the configured QCI of the GBR bearers, but the overachievement is controlled.

Figure 5:
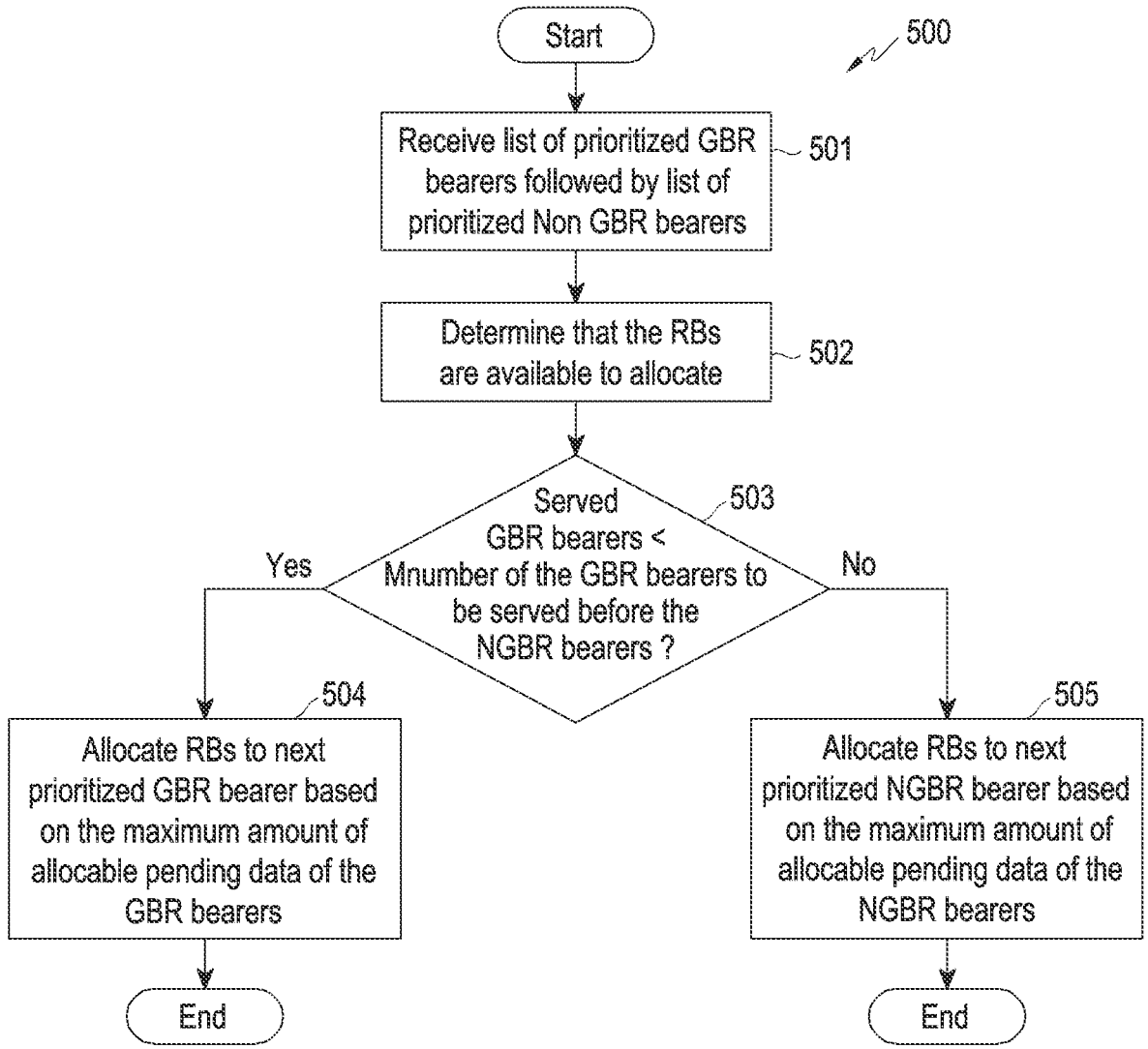
FIG. 5 illustrates a flow diagram of the method for allocating RBs to the GBR bearers and the NGBR bearers, according to an embodiment of the disclosure.

FIG. 5 illustrates a flow diagram (500) of the method for allocating the RBs to the GBR bearers and the NGBR bearers, according to an embodiment of the disclosure.

Referring to FIG. 5, the method allows the AI based scheduler (110) to perform operations 501-505 of the flow diagram (500). At operation 501, the method includes receiving the list of prioritized GBR bearers and the list of prioritized NGBR bearers. At operation 502, the method includes determining that the RBs are available to allocate. At operation 503, the method includes determining whether the served GBR bearers are less than the number of the GBR bearers to be served before the NGBR bearers. At operation 504, the method includes allocating the RBs to the next prioritized GBR bearers based on the maximum amount of allocable pending data of the GBR bearers, in response to determining that the served GBR bearers are less than the number of the GBR bearers to be served before the NGBR bearers (i.e., Yes). At operation 505, the method includes allocating the RBs to the next prioritized NGBR bearers based on the maximum amount of allocable pending data of the NGBR bearers, in response to determining that the served GBR bearers are not less than the number of the GBR bearers to be served before the NGBR bearers (i.e., No).

The various actions, acts, blocks, steps, or the like in the flow diagrams (A300, B300, 500) are performed in the order presented, in a different order, or simultaneously. Further, in some embodiments, some of the actions, acts, blocks, steps, or the like may be omitted, added, modified, skipped, or the like without departing from the scope of the disclosure.

Figure 6:
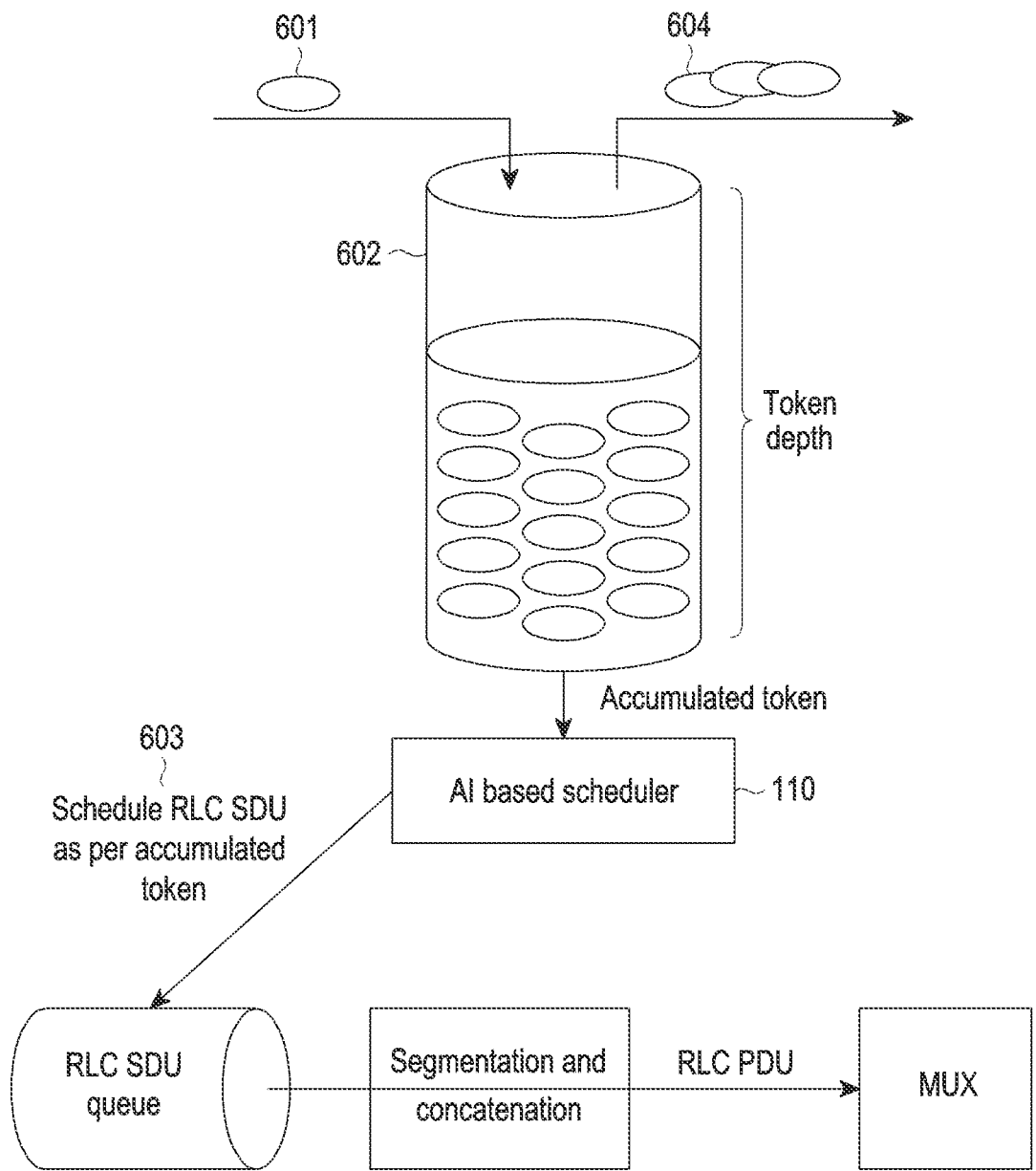
FIG. 6 illustrates a schematic diagram of a token bucket, according to an embodiment of the disclosure.

FIG. 6 illustrates a schematic diagram of a token bucket (602), according to an embodiment of the disclosure.

In order to have more control over the allocation of the radio resources to the GBR and NGBR bearers aligned to desired objective of improving performance of the NGBR bearers, the AI based scheduler (110) dynamically controls and tunes the resource allocation parameters includes the number of the GBR bearers to be served before the NGBR bearers i.e. MaxNumGBRScheduledBeforeNGBR, the maximum amount of allocable pending data of the GBR bearers, i.e.

PercentageTokenDepthGBRAllocation, and the maximum amount of allocable pending data of the NGBR bearers i.e. PercentageTokenDepthNonGBRAllocation, by an RL based AI engine (114) that uses the MDP. The AI based scheduler (110) serves a fixed number (a high number) of GBR bearers before any the NGBR bearers.

Instead of serving the GBR bearer up to its outstanding data availability, the PercentageTokenDepthGBRAllocation is used to control the serviceable data for the GBR bearers based on a percentage of its token depth. The token depth of the GBR bearers is defined as allowable accumulated bytes that may be sent for the GBR bearers in the time slot based on a configured guaranteed bit rate of the GBR bearers. For example, the GBR bearer is configured with the GBR of 2 megabytes per second, which is allowed to send an additional maximum of 125 bytes (i.e. token) in a time slot with a Subcarrier Spacing (SCS) of 30 kilohertz. Any unsent data (i.e. token) in the time slot gets accumulated for transmission in the later slots.

Instead of serving the NGBR bearers up to its outstanding data availability, the PercentageTokenDepthNonGBRAllocation is used to control the serviceable data for the NGBR bearers based on the percentage of its token depth. The token depth of the NGBR bearers is based on a configured UE AMBR. The AMBR defines an aggregate maximum bit rate for the UE across all its configured NGBR bearers. The token depth of the NGBR bearers is calculated at a UE level and then divided among the NGBR bearers of the UE based on a weighted priority. The weights for each constituent NGBR bearer are chosen in a ratio of the configured priority (or any other alternate parameter such as outstanding BO) of the NGBR. For example, the UE is configured with the AMBR of 6 megabytes per second, is allowed to send a maximum of 375 bytes (i.e. tokens) in the time slot with the SCS of 30 kilohertz. If the UE is configured with 2 NBGR bearers of priority 6 and 8 respectively then a token value 1=(6*375/14): 160 Bytes, and a token value 2=8*375/14=215 bytes.

The AI based scheduler (110) adds the token (601) to the token bucket (602) and accumulates on per slot basis. Further, the AI based scheduler (110) schedules a Radio Link Control Service Data Unit (RLC SDU) as per the accumulated token (603) and generates a queue for serving the accumulated token. Upon reaching time to serve the token, the AI based scheduler (110) serves the accumulated token (603) in form on RLC Protocol Data Units (PDUs) to a multiplexer (MUX) based on the allocation by performing segmentation and concatenation.

Figure 7:
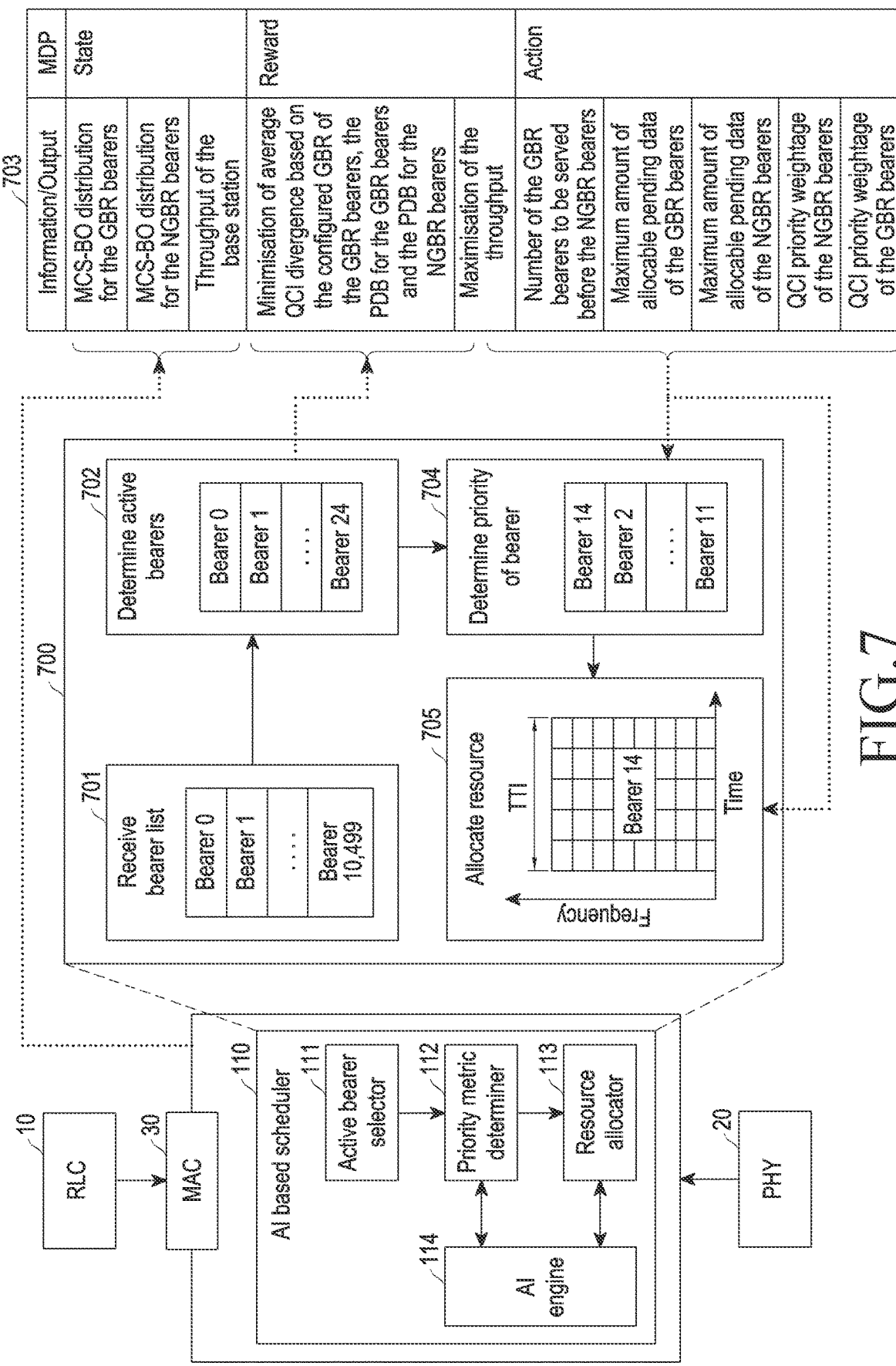
FIG. 7 is a block diagram of the AI based scheduler of the base station for minimizing an average QCI divergence of the bearers of each QCI class, according to an embodiment of the disclosure.

FIG. 7 is a block diagram of the AI based scheduler (110) of the base station (100) for minimizing the average QCI divergence of the bearers of each QCI class, according to an embodiment of the disclosure.

At 700, the AI based scheduler (110) allocates the radio resources for bearers based on the BO and the CSI received at the MAC layer (30) by minimizing the average QCI divergence of the bearers of each QCI class. 701-705 are the sub-steps under the operation 700. At operation 701, the active bearer selector (111) receives the list of bearers (e.g. bearer 0 to bearer 10,499) in the base station (100), where the bearers are the GBR bearers and the NGBR bearers. At operation 702, the active bearer selector (111) determines active bearers connected to the UEs (e.g. bearer 0 to bearer 24) from the list of bearers. The active bearer selector (111) determines the configured PDB of the bearers of each QCI class. Further, the active bearer selector (111) monitors the PDB of the bearers of each QCI class during the data communication. Further, the active bearer selector (111) determines the average of QCI divergence of the bearers of each QCI class.

Further, the priority metric determiner (112) and the resource allocator (113) minimize the average QCI divergence of the bearers of each QCI class by controlling the resource allocation parameters, and the priority metric parameters of the bearers of each QCI class using the AI engine (114). The priority metric per bearer may be formalised as $(\alpha*\text{Throughput Maximization})+(\beta*\text{fairness})+(\gamma*\text{Priority})-(\delta*\text{delay})$. The throughput maximization aims at prioritizing the UEs with higher MCS. The fairness intends to provide a balance across all the UEs based on their past achieved throughput. The priority intends to prioritise users with higher configured bearer priority. The delay intends to minimise the PDB delay experienced by individual bearers. The parameters $\alpha, \beta, \gamma, \delta$ are usually preconfigured for a deployment.

In order to achieve the QCI compliance across all the GBR and NGBR bearers, there is a need to dynamically control the priority metric calculation in addition to controlling the resource allocation. The priority metric determiner (112) uses the AI engine (114) to choose most optimal value of $\gamma$ that controls effect of the bearer's priority metric for a given configured values of $\alpha, \beta$ and $\delta$. For minimizing the average QCI divergence of the bearers of each QCI class, at 703 the priority metric determiner (112) or the resource allocator (113) determining the state of the AI engine (114)

includes the MCS-BO distribution for the GBR bearers, the MCS-BO distribution for the NGBR bearers, and the throughput of the base station (100). At 704, the priority metric determiner (112) determines the priority metric of each active bearer in each TTI or each time slot based on the priority metric parameters which is the action of the AI engine (114).

Further, the priority metric determiner (112) modifies the priority metric based on the priority metric parameters for achieving the reward of the minimization of the average QCI divergence per QCI class and the maximization of the throughput. Further, the priority metric determiner (112) arranges the bearers based on descending order of the modified priority metric. At 705, The resource allocator (113) determines the resource allocation parameters using the AI engine (114) based on the state for obtaining the reward of the AI engine (114) including the minimization of the average QCI divergence and maximization of the throughput. The resource allocator (43) allocates the radio resources to the bearers based on the resource allocation parameters and the order of the priority of the bearers.

The embodiments disclosed herein may be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for managing scheduling performance of bearers by a base station in a wireless network, the method comprising:
    determining a configured packet delay budget (PDB) of non-guaranteed bit rate (NGBR) bearers and a configured PDB of guaranteed bit rate (GBR) bearers;
    monitoring a PDB of the NGBR bearers and a PDB of the GBR bearers during data communication;
    determining an average of quality-of-service class identifier (QCI) divergence of the NGBR bearers and an average of QCI divergence of the GBR bearers, wherein the QCI divergence of a bearer is a percentage variation between a monitored PDB and a configured PDB of the bearer; and
    controlling resource allocation parameters for minimizing the average of QCI divergence of the NGBR bearers and the average of QCI divergence of the GBR bearers.

2. The method of claim 1, wherein the average of QCI divergence of the GBR bearers is minimized by maintaining the monitored PDB of each GBR bearer to be lesser than the configured PDB of the GBR bearer.

3. The method of claim 1, wherein controlling the resource allocation parameters comprises:
    determining the resource allocation parameters comprising a number of the GBR bearers to be served before the NGBR bearers, a maximum amount of allocable pending data of the GBR bearers, and a maximum amount of allocable pending data of the NGBR bearers using an artificial intelligence (AI) engine; and
    allocating resource blocks (RBs) to the GBR bearers and the NGBR bearers based on the resource allocation parameters for the data communication.

4. The method of claim 3, wherein allocating the RBs to the GBR bearers and the NGBR bearers based on the resource allocation parameters for the data communication, comprises:
    receiving a list of prioritized GBR bearers and a list of prioritized NGBR bearers;
    determining that the RBs are available to allocate;
    determining whether served GBR bearers are less than the number of the GBR bearers to be served before the NGBR bearers;
    allocating the RBs to next prioritized GBR bearers based on the maximum amount of allocable pending data of the GBR bearers, in response to determining that the served GBR bearers are less than the number of the GBR bearers to be served before the NGBR bearers; and
    allocating the RBs to next prioritized NGBR bearers based on the maximum amount of allocable pending data of the NGBR bearers, in response to determining that the served GBR bearers are not less than the number of the GBR bearers to be served before the NGBR bearers.

5. The method of claim 3, wherein determining the resource allocation parameters using the AI engine, comprises:
    determining a state of the AI engine comprising a modulation and coding scheme-buffer occupancy (MCS-BO) distribution for the GBR bearers, an MCS-BO distribution for the NGBR bearers, and a throughput of the base station; and
    determining the resource allocation parameters using the AI engine based on the state for obtaining a reward of the AI engine comprising minimization of the average QCI divergence and maximization of the throughput.

6. A method for managing scheduling performance of bearers by a base station in a wireless network, the method comprising:
    determining a configured packet delay budget (PDB) of bearers of each quality-of-service class identifier (QCI) class;
    monitoring the PDB of the bearers of each QCI class during data communication;
    determining an average of QCI divergence of the bearers of each QCI class, wherein the QCI divergence of a bearer is a percentage variation between a monitored PDB and a configured PDB of the bearer; and
    controlling resource allocation parameters, priority metric parameters of the bearers of each QCI class for minimizing the average QCI divergence of the bearers of each QCI class.

7. The method of claim 6, wherein controlling the resource allocation parameters, and the priority metric parameters of the bearers of each QCI class, comprises:
    determining the resource allocation parameters comprising a number of guaranteed bit rate (GBR) bearers to be served before non-guaranteed bit rate (NGBR) bearers, a maximum amount of allocable pending data of the GBR bearers, a maximum amount of allocable pending data of the NGBR bearers, and the priority metric parameters of the bearer comprising a QCI priority weightage of the NGBR bearers and a QCI priority weightage of the GBR bearers using an artificial intelligence (AI) engine; and allocating resource blocks (RBs) to the GBR bearers and the NGBR bearers based on the resource allocation parameters and the priority metric parameters for the data communication.

8. The method of claim 7, wherein allocating the RBs to the GBR bearers and the NGBR bearers based on the resource allocation parameters and the priority metric parameters for the data communication, comprises:

receiving a list of prioritized GBR bearers and a list of prioritized NGBR bearers adjusted based on the priority metric parameters;

determining that the RBs are available to allocate;

determining whether served GBR bearers are less than the number of the GBR bearers to be served before the NGBR bearers; and allocating the RBs to next prioritized GBR bearers based on the maximum amount of allocable pending data of the GBR bearers, in response to determining that the served GBR bearers are less than the number of the GBR bearers to be served before the NGBR bearers; and allocating the RBs to next prioritized NGBR bearers based on the maximum amount of allocable pending data of the NGBR bearers, in response to determining that the served GBR bearers are not less than the number of the GBR bearers to be served before the NGBR bearers.

9. The method of claim 7, wherein determining the resource allocation parameters and the priority metric parameters using the AI engine, comprises:

determining a state of the AI engine comprising a modulation and coding scheme-buffer occupancy (MCS-BO) distribution for the GBR bearers, an MCS-BO distribution for the NGBR bearers, and a throughput of the base station; and determining the resource allocation parameters and the priority metric parameters using the AI engine based on the state for obtaining a reward of the AI engine comprising minimization of the average QCI divergence per QCI class and maximization of the throughput, wherein the QCI class is a $5^{th}$ generation quality-of-service identifier (5QI) value.

10. The method of claim 7, wherein the maximum amount of allocable pending data of the GBR bearers is determined based a configured GBR of the GBR bearers, and wherein the maximum amount of allocable pending data of the NGBR bearers is determined based on configured aggregate maximum bit rate (AMBR) and configured QCI priority of the NGBR bearers.

11. A base station for managing scheduling performance of bearers in a wireless network, comprising:

memory storing instructions; and at least one processor coupled to the memory, wherein the instructions, when executed by the at least one processor, cause the base station to:

determine a configured packet delay budget (PDB) of the non-guaranteed bit rate (NGBR) bearers and a configured PDB of guaranteed bit rate (GBR) bearers, monitor a PDB of the NGBR bearers and a PDB of the GBR bearers during data communication, determine an average of quality-of-service class identifier (QCI) divergence of the NGBR bearers and an average of QCI divergence of the GBR bearers, wherein the QCI divergence of a bearer is a percentage variation between a monitored PDB and a configured PDB of the bearer, and control resource allocation parameters for minimizing the average of QCI divergence of the NGBR bearers and the average of QCI divergence of the GBR bearers.

12. The base station of claim 11, wherein the instructions, when executed by the at least one processor, further cause the base station to maintain the PDB of each GBR bearer to be lesser than the configured PDB of the GBR bearer for minimizing the average of QCI divergence of the GBR bearers includes minimizing of the average of QCI divergence of the GBR bearers.

13. The base station of claim 11, wherein, for minimizing the average of QCI divergence of the GBR bearers includes minimizing of the average of QCI divergence of the GBR bearers, the instructions, when executed by the at least one processor, further cause base station to:

determine the resource allocation parameters comprising a number of the GBR bearers to be served before the NGBR bearers, a maximum amount of allocable pending data of the GBR bearers, and a maximum amount of allocable pending data of the NGBR bearers using an artificial intelligence (AI) engine, and allocate resource blocks (RBs) to the GBR bearers and the NGBR bearers based on the resource allocation parameters for the data communication.

14. The base station of claim 13, wherein, for allocating the RBs to the GBR bearers and the NGBR bearers based on the resource allocation parameters for the data communication, the instructions, when executed by the at least one processor, further cause the base station to:

receive a list of prioritized GBR bearers and a list of prioritized NGBR bearers, determine that the RBs are available to allocate, determine whether served GBR bearers are less than the number of the GBR bearers to be served before the NGBR bearers, allocate the RBs to next prioritized GBR bearers based on the maximum amount of allocable pending data of the GBR bearers, in response to determining that the served GBR bearers are less than the number of the GBR bearers to be served before the NGBR bearers, and allocate the RBs to next prioritized NGBR bearers based on the maximum amount of allocable pending data of the NGBR bearers, in response to determining that the served GBR bearers are not less than the number of the GBR bearers to be served before the NGBR bearers.

15. The base station of claim 13, wherein, for determining the resource allocation parameters using the AI engine, the instructions, when executed by the at least one processor, further cause the base station to:

determine a state of the AI engine comprising a modulation and coding scheme-buffer occupancy (MCS-BO) distribution for the GBR bearers, an MCS-BO distribution for the NGBR bearers, and a throughput of the base station, and determine the resource allocation parameters using the AI engine based on the state for obtaining a reward of the AI engine comprising minimization of the average QCI divergence and maximization of the throughput.

16. A base station for enhancing relative scheduling performance of non-guaranteed bit rate (NGBR) bearers in a wireless network, comprises:
memory storing instructions; and
at least one processor coupled to the memory,
wherein the instructions, when executed by the at least one processor, cause the base station to:
determine a configured packet delay budget (PDB) of bearers of each quality-of-service class identifier (QCI) class,
monitor the PDB of the bearers of each QCI class during data communication,
determine an average of QCI divergence of the bearers of each QCI class, wherein the QCI divergence of a bearer is a percentage variation between a monitored PDB and a configured PDB of the bearer, and
control resource allocation parameters, and priority metric parameters of the bearers of each QCI class for minimizing the average QCI divergence of the bearers of each QCI class.

17. The base station of claim 16, wherein, for minimizing the average QCI divergence of the bearers of each QCI class, the instructions, when executed by the at least one processor, further cause the base station is configured to:
determine the resource allocation parameters comprising a number of guaranteed bit rate (GBR) bearers to be served before non-guaranteed bit rate (NGBR) bearers, a maximum amount of allocable pending data of the GBR bearers, a maximum amount of allocable pending data of the NGBR bearers, and the priority metric parameters of the bearer comprising a QCI priority weightage of the NGBR bearers and a QCI priority weightage of the GBR bearers using an artificial intelligence (AI) engine, and
allocating resource blocks (RBs) to the GBR bearers and the NGBR bearers based on the resource allocation parameters and the priority metric parameters for the data communication.

18. The base station of claim 17, wherein, for allocating of the RBs to the GBR bearers and the NGBR bearers based on the resource allocation parameters and the priority metric parameters for the data communication, the instructions, when executed by the at least one processor, further cause the base station to:
receive a list of prioritized GBR bearers and a list of prioritized NGBR bearers adjusted based on the priority metric parameters,
determine that the RBs are available to allocate,
determine whether served GBR bearers are less than the number of the GBR bearers to be served before the NGBR bearers,
allocate the RBs to next prioritized GBR bearers based on the maximum amount of allocable pending data of the GBR bearers, in response to determining that the served GBR bearers are less than the number of the GBR bearers to be served before the NGBR bearers, and
allocate the RBs to next prioritized NGBR bearers based on the maximum amount of allocable pending data of the NGBR bearers, in response to determining that the served GBR bearers are not less than the number of the GBR bearers to be served before the NGBR bearers.

19. The base station of claim 17, wherein, for determining the resource allocation parameters and the priority metric parameters using the AI engine, the instructions, when executed by the at least one processor, further cause the base station to:
determine a state of the AI engine comprising a modulation and coding scheme-buffer occupancy (MCS-BO) distribution for the GBR bearers, an MCS-BO distribution for the NGBR bearers, and a throughput of the base station, and
determine the resource allocation parameters and the priority metric parameters using the AI engine based on the state for obtaining a reward of the AI engine comprising minimization of the average QCI divergence per QCI class and maximization of the throughput, wherein the QCI class is a $5^{th}$ generation quality-of-service identifier (5QI) value.

20. The base station of claim 17,
wherein the maximum amount of allocable pending data of the GBR bearers is determined based a configured GBR of the GBR bearers, and
wherein the maximum amount of allocable pending data of the NGBR bearers is determined based on a configured aggregate maximum bit rate (AMBR) and a configured QCI priority of the NGBR bearers.

* * * * *